United States Patent [19]

Pittman

[11] Patent Number: 5,064,454
[45] Date of Patent: Nov. 12, 1991

[54] FILTRATION REMOVAL OF MATTER FROM GAS STREAMS, WITH OFF-LINE CLEANING OF FILTERS

[76] Inventor: James Pittman, 165 Governor's Green Rd., Dundas, Ontario, Canada, L9H 6L6

[21] Appl. No.: 448,845

[22] Filed: Dec. 12, 1989

[30] Foreign Application Priority Data

Jan. 3, 1989 [CA] Canada ................................ 587446

[51] Int. Cl.$^5$ ............................................. B01D 46/04
[52] U.S. Cl. ..................................... 55/302; 55/341.1; 55/350; 55/356; 55/430; 55/432; 55/467
[58] Field of Search ............... 55/302, 312, 314, 341.1, 55/342, 350, 356, 385.2, 430, 432, 484, 467

[56] References Cited

U.S. PATENT DOCUMENTS

| | | | |
|---|---|---|---|
| 619,912 | 2/1899 | Sutcliffe | 55/430 |
| 1,628,601 | 5/1927 | Fiend | 55/96 |
| 1,928,670 | 10/1933 | McCrery | 55/300 |
| 2,892,512 | 6/1959 | Watts et al. | 55/213 |
| 3,635,002 | 1/1972 | Ries | 55/430 |
| 3,849,091 | 11/1974 | Peterson | 55/302 |
| 3,948,623 | 4/1976 | Ostby et al. | 55/96 |
| 3,966,434 | 6/1976 | Frazier | 55/96 |
| 4,097,251 | 6/1978 | Murayama et al. | 55/97 |
| 4,218,227 | 8/1980 | Frey | 55/484 |
| 4,277,255 | 7/1981 | Apelgren | 55/20 |
| 4,306,888 | 12/1981 | Cheng | 55/96 |
| 4,329,161 | 5/1982 | Osborn | 55/96 |
| 4,411,674 | 10/1983 | Forgac | 55/304 |
| 4,507,130 | 3/1985 | Roth | 55/341.5 |
| 4,541,846 | 9/1985 | Sjodin | 55/385.2 |
| 4,578,840 | 4/1986 | Pausch | 55/356 |
| 4,723,969 | 2/1988 | DeMarco | 55/97 |
| 4,735,639 | 4/1988 | Johnstone | 55/302 |
| 4,775,398 | 10/1988 | Howeth | 55/341.1 |

FOREIGN PATENT DOCUMENTS

0246106 11/1987 European Pat. Off. .
778537 7/1957 United Kingdom ................. 55/302

Primary Examiner—Bernard Nozick
Attorney, Agent, or Firm—Carson, Armstrong

[57] ABSTRACT

Apparatus for the removal of asbestos or other matter from a gas stream in a conduit is disclosed. The apparatus includes at least two filter units installed in parallel to receive and filter the gas stream from the conduit, outlets for solid matter at the bottom of each filter unit, and first and second valves respectively on either side of each filter unit for isolating each filter unit for cleaning by compressed air jets when desired. Preferably, the apparatus includes a displacement chamber upstream of the filter units, with much of the asbestos being removed from the bottom thereof. The outlets at the bottom of each filter unit and the collecting and discharge area at the bottom of the displacement chamber are sealed from the surrounding environment, and the filtered solid matter is discharged into bags via at least one bagging unit sealed to the outlets and the discharge area. Preferably, third valves are provided at the solid matter outlet of each filter unit, and these outlets are connected back to the displacement chamber via a return conduit. Fourth valves from the filter unit are connected to a higher pressure gas source, such as the atmosphere in a vacuum system, so that the solid matter may be routed back to the displacement chamber by closing the first and second valves and opening the third and fourth valves.

10 Claims, 8 Drawing Sheets

FILTRATION REMOVAL OF MATTER FROM GAS STREAMS, WITH OFF-LINE CLEANING OF FILTERS

BACKGROUND OF THE INVENTION

This invention relates to apparatus for the removal and collection of particulate and fibrous matter. The apparatus is particularly intended for use as an asbestos removal system, but has a broader application to the removal of particulate and fibrous matter generally.

For convenience, reference will be made throughout this specification to asbestos and asbestos removal. However, it should be understood that this reference is as an example only.

In some applications, the matter being collected may be toxic or otherwise harmful to people or the environment, so the escape of the solid matter must be prevented. This is the case with asbestos removal systems, for example.

The potential health problems associated with asbestos fibers, especially the "fines" or very short fibers, have become very well publicized, leading to extensive efforts to remove asbestos insulation from buildings and other sites. Typically, the asbestos is stripped from the walls and ceilings, and then collected for disposal, by workers wearing suitable protective clothing and breathing apparatus.

There is thus a need for apparatus which can effectively collect the stripped asbestos fibers, without permitting the fines to escape into the environment.

The obvious way to deal with the collection of asbestos and asbestos fibers is with, in effect, a large vacuum cleaner equipped with suitable filters. This indeed has been attempted in various configurations in the prior art. However, since the filters tend to become clogged very rapidly, they require frequent cleaning. Problems in the past have included how to clean the filters efficiently, how to clean the filters without shutting down operations, and how to avoid the escape of asbestos fibers during the filter cleaning process.

It is highly undesirable to have to shut down operations for filter cleaning. Accordingly, there are prior art systems in which filters may undergo continuous or periodic cleaning by means such as vibration or mechanical cleaning, or by the use of pulsed air jets directed back through the filters. Such cleaning means suffer from the fact that the filter remains in operation during the cleaning, which greatly reduces the effectiveness of the cleaning; debris stripped from the filter tends to be drawn right back to the filter by the gas stream.

There is thus a need for apparatus in which cleaning of filters can be conducted more effectively, without needing to shut down the operation of the system. The need is particularly evident in applications such as asbestos removal, where large volumes of solid matter are involved, since the filters tend to become clogged very rapidly and thus require frequent cleaning.

Related to the problem of clogging of filters is the inability of prior art systems to operate at sufficiently high suction (i.e. low pressure, or large pressure differential below ambient pressure). One reason for this inability is the large pressure differential across the filters as they become clogged. Another reason relates to the difficulty of sealing the system to maintain the high suction (low pressure). It has to be possible to remove the asbestos from the system without seriously affecting the operating pressure.

Being able to operate at high suction (low pressure) means being able to run a longer intake hose and means better performance in terms of system throughput, resulting in reduced operating costs in general and labor costs specifically. In addition, where the asbestos is being removed from a building, the lower operating pressure makes it easier to maintain the desired pressure differential between the inside and outside of the building from which the asbestos is being removed.

SUMMARY OF THE INVENTION

In view of the above problems, it is thus an object of the invention to provide improved apparatus for filtering solid matter from a gas stream, including improved cleaning of filters.

The present invention therefore provides apparatus for the removal of matter from a gas stream in a conduit, including at least two filter units installed in parallel with the gas stream to receive and filter the gas stream. Outlets for solid matter are provided at the bottom of each filter unit. Valves are provided for blocking flow from each filter unit for cleaning when desired.

Preferably, the apparatus includes a collection chamber or "displacement chamber" upstream of the filter units, the collection chamber having an inlet for receiving the gas stream, a solid matter collecting and discharging area at the bottom thereof, and a gas stream exit from an upper area thereof, leading to the filter units.

In the invention, the filters in the filter units can be cleaned without removing them from the system, and without affecting the integrity of the system. Preferably, the cleaning is effected by compressed air jets directed towards the filters from the clean side, operable to dislodge solid matter from the dirty side. In the preferred embodiment, including a displacement chamber, the particulate and/or fibrous matter cleaned from the filters is recycled into the displacement chamber, so that discharge to the atmosphere is prevented.

In the preferred embodiment for collection of asbestos particles and fibers for example, the outlets at the bottom of each filter unit and the collecting and discharge area at the bottom of the collection chamber are sealed from the surrounding environment to prevent the escape of filtered solid matter, the filtered solid matter being discharged into bags via at least one bagging unit sealed to the outlets and the discharge area. Preferably in such an embodiment third valves are provided at the solid matter outlet of each filter unit, and these outlets are connected back to the collection chamber via a return conduit. Fourth valves from the filter unit are connected to a gas source at higher pressure than the pressure in the collection chamber - such as the ambient atmosphere - whereby the solid matter may be routed to the collection chamber by closing the first and second valves (upstream and downstream respectively of the filter units) and opening the third and fourth valves.

The solid matter collection and discharge assembly at the bottom of the collection chamber preferably includes a discharge tunnel and a piston reciprocating in the discharge tunnel to force a plug of solid matter along the discharge tunnel. Sealing of the discharge area is by virtue of the plug of solid matter in the discharge tunnel jamming back into a throat portion. The discharge tunnel preferably leads directly to automatic bagging apparatus, which bags the solid matter without permitting in to escape to the environment.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
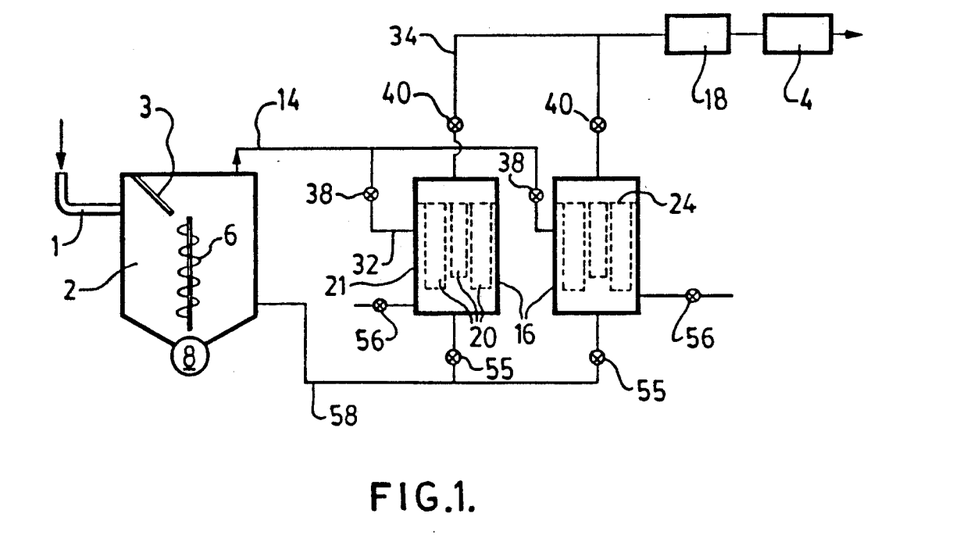
FIG. 1 is a schematic illustration of the apparatus.

The gas stream is, for example, one in which asbestos or other debris is sucked through a hose 1, from a building from which asbestos is being removed, for example, into the collection chamber or "displacement chamber" 2. A baffle 3 directs the incoming air downwardly within the displacement chamber. The system is operated at negative pressure, i.e. under suction, by virtue of a large blower 4, which acts to draw air through the system. On entering the displacement chamber, most of the solid matter falls to the bottom. A vertically mounted screw 6 urges the solid matter towards the bottom of the chamber.

Figure 12:
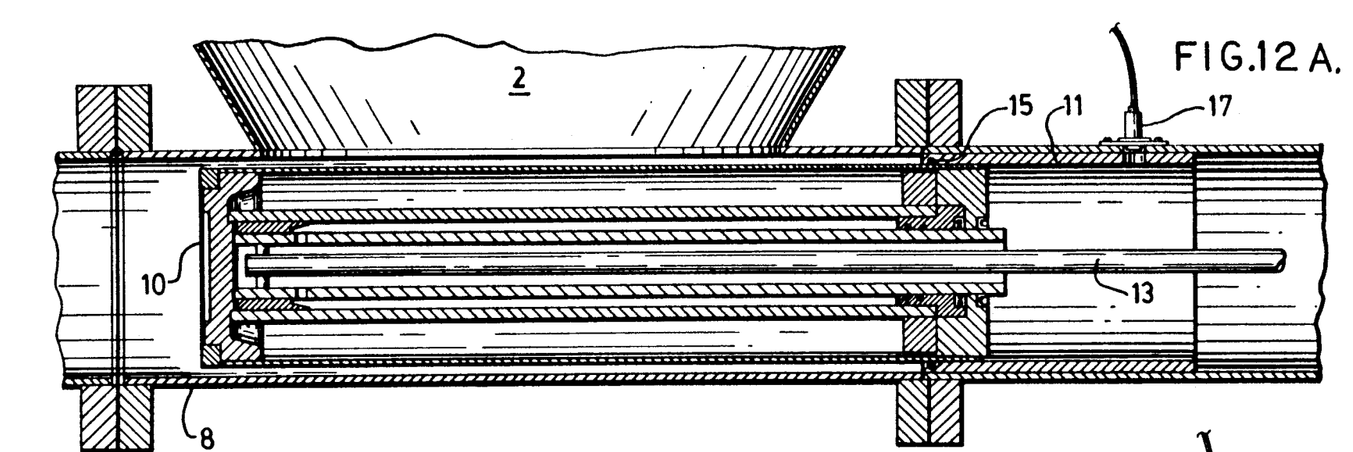
FIGS. 12A and 12B are cross-sections of the discharge tunnel, showing the piston in the extended and retracted positions respectively.
Figure 13A:
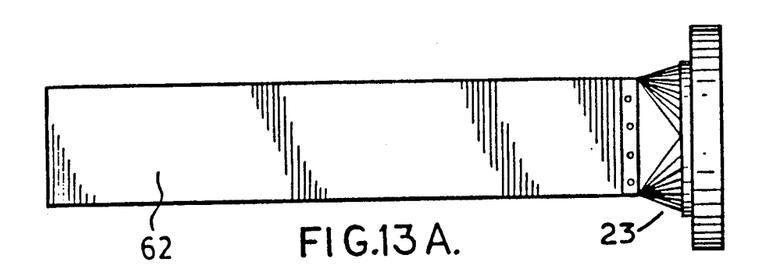
FIGS. 13A, 13B and 13C show top, side and end views respectively of the discharge tunnel.
Figure 13B:
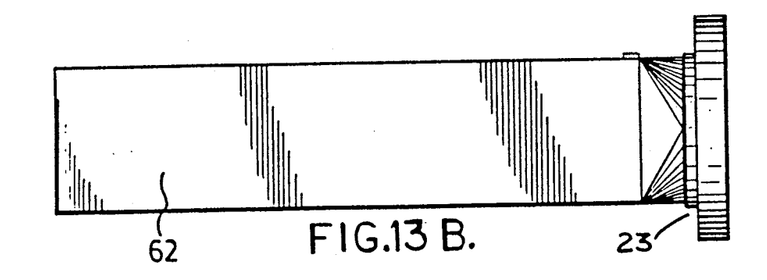
Figure 13C:
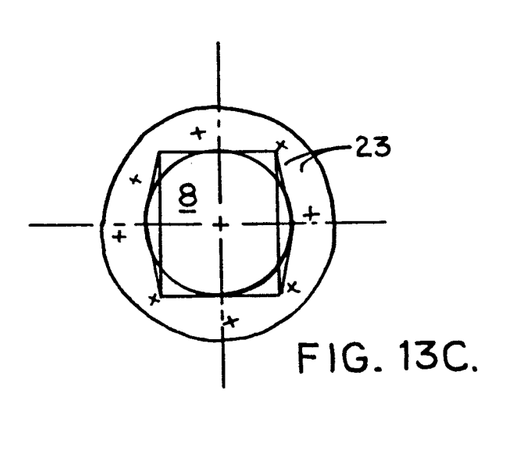

In embodiments where a sealed system is required in order to prevent the escape of collected matter to the environment, as is the case with asbestos collection, the bottom of the displacement chamber preferably opens into the top of a horizontal discharge tunnel 8, which in the preferred embodiment is cylindrical. A hydraulic piston 10 (see FIGS. 12A and 12B) reciprocates in the tunnel and acts to compact a plug of solid matter and force it out through the discharge tunnel to an automatic bagging machine 12 (shown schematically in FIG. 4). As will be described in greater detail later, the compacted solid matter acts to seal the discharge tunnel from the ambient air pressure, to prevent blow backs and to maintain the negative pressure in the displacement chamber.

The air leaves the displacement chamber 2 from the top via a displacement chamber exhaust 14. Although much of the solid matter is removed in the displacement chamber, this air does still have a high solid matter content. The entrained solid matter must be filtered from the air. This is accomplished by filter units 16, preferably followed by a backup HEPA filter unit 18. The air from the displacement chamber is passed through one of the filter units 16. The cleaned air is subsequently passed through backup filter 18 before discharge into the atmosphere. The backup filter is primarily for the purpose of avoiding an accidental release of contaminant in the event of failure of one of the filter units.

Figure 9:
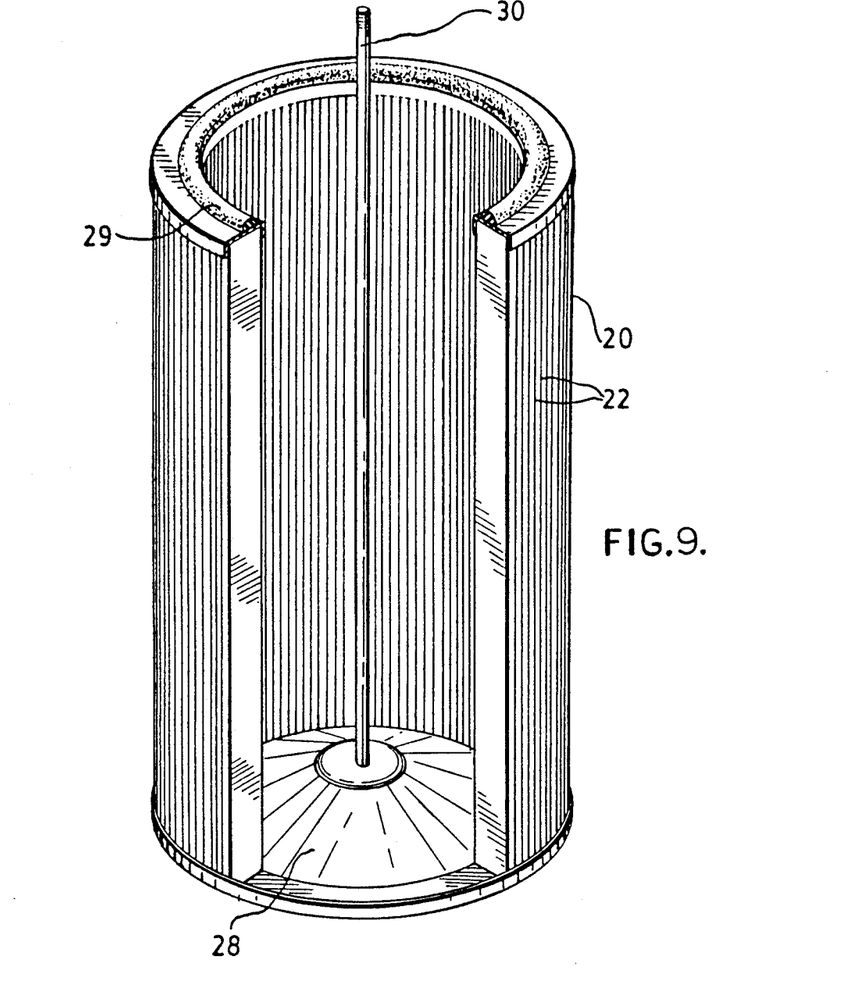
FIG. 9 is a perspective of one of the filters.
Figure 10:
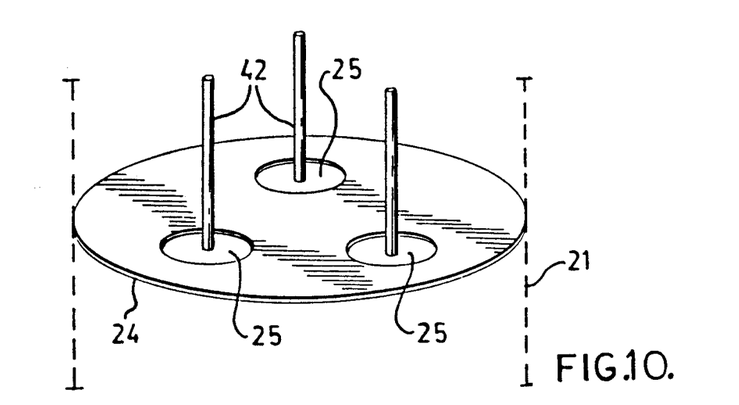
FIG. 10 is an illustration of a horizontal plate in each filter unit at the top the filters.
Figure 11:
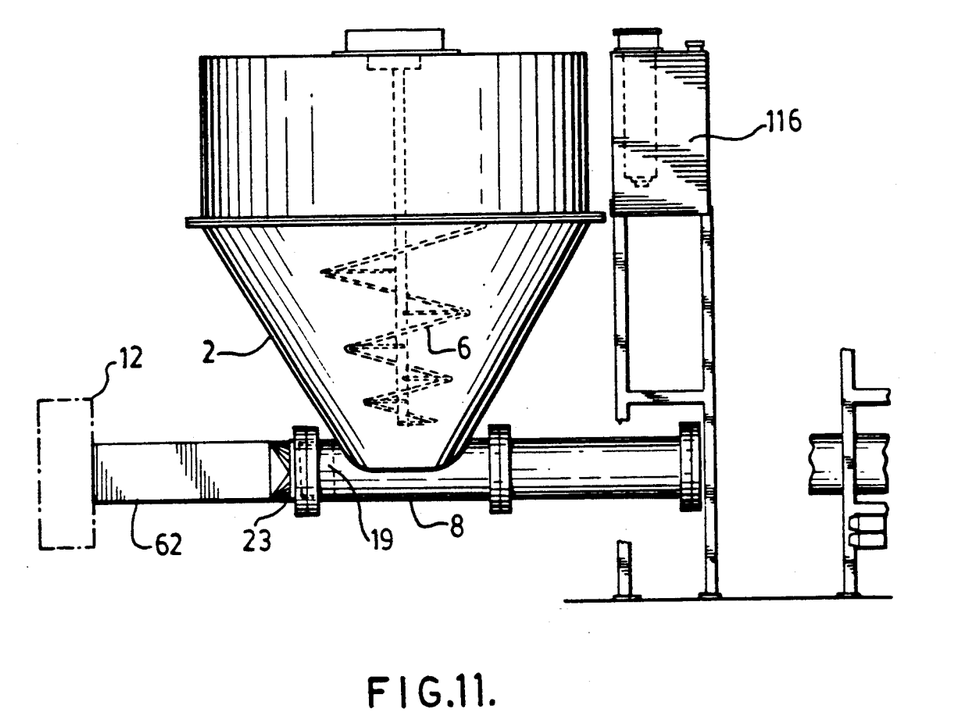
FIG. 11 another elevation view of the collection chamber or "displacement chamber"

Each filter unit 16 includes three cylindrical cartridge-type filters 20 approximately 26 inches high and 12 inches in diameter, stacked side by side in the filter housing 21. Each filter 20, shown in FIG. 9, is a Gore-Tex (trademark) filter, supplied by W. L. Gore & Associates, Inc., of Elkton, Md., U.S.A.. Each filter has a series of pleated screens 22 which remove the solid matter from the air. The outside of each filter is the "dirty" side, and the center is the "clean" side. The filters have an enclosed bottom 28, and an open top with a resilient sealing ring 29 around the upper annulus. Inside the filter unit near the top thereof is a horizontal plate 24, shown in FIG. 10, having three circular openings 25 approximately 9 inches in diameter, corresponding to the open top of the filters. The filters are pulled upwardly by bolts 30 to compress the sealing rings against the horizontal plate.

For each filter unit, the filter inlet 32 from the displacement chamber is at the side of the filter housing 21. The filter exhaust 34 draws from the top center of the filter unit housing, i.e. on the clean side of the screens 22. The only route from the inlet to the exhaust is thus through the pleated screens of the filters, then up and out through the openings 25 in the horizontal plate, and then out the exhaust.

The mentioned above, the problem in the past has always been how to clean the filters. In the present invention, this problem has been solved by utilizing at least two filter units 16, so that at least one can be on line at any given time while one or more other units can be off line for cleaning. The simplest case is where there are two filter units, and this is the case which will be described in the following.

While one filter unit 16 is operating, the other filter unit is in a cleaning or purge cycle. During the purge cycle for a filter unit, pneumatic valves 38 and 40 are closed to isolate the filter unit. Three air jets 42, one near the top of each filter unit in the area above the horizontal plate 24 are fed from a manifold 44 connected to a compressor 46. They are then activated in rapid sequence to blow the accumulated solid matter off the screens. The air jets are located a few inches above the top of each filter, with the blast aimed downwardly. The jets have no special nozzle, but rather consist simply of an open-ended pipe, which produces a blast in a cone of typically about 20 degrees, i.e. 10 degrees from the vertical in each direction, which blows outwardly from the inside of the filters.

The solid matter blown from the filter by the air jets falls to the bottom of the filter housing 21. In the simplest embodiment, the solid matter can then simply be dumped out into a container or onto a conveyer, or can be otherwise disposed of. In the sealed system embodiment, the system is somewhat more complex. In the bottom of the filter housing, an agitator 50 keeps the solid matter in suspension to prevent it from settling and compacting. The agitator is driven by a motor connected to the agitator shaft via a chain. After the air jets are finished cleaning the screens, pneumatic return valve 55 is opened briefly as well as a valve 56 to atmosphere at the back of the filter unit, so that the solid matter at the bottom of the filter unit is drawn back into the displacement chamber 2 via a return pipe 58 to main filter unit emptying point 59. Valves 55 and 56 are then closed. The outlet of valve 56 is protected by a HEPA filter, so that accidental release of contaminant is avoided. The filter unit is then ready when needed. When it is time to clean the other filter unit, the valves 38 and 40 can be reopened to put the filter back on line, and the corresponding valves can be closed to isolate the other filter unit for cleaning.

Preferably, an automated or at least semi-automated control system is employed for the cycling between filters. Pressure gauges are used to detect the pressure drop across the filter units. When too high a pressure differential is detected, indicating that the filter is becoming clogged, that filter is taken off line for cleaning and the other filter goes on line.

With this system of filtration and filter cleaning, frequent cleaning of the filters is possible, so that the filters can be kept operating at near maximum efficiency and near minimum pressure drop. This means better overall performance, and lower operating pressure (higher suction) with the advantages mentioned previously. Clogging of the filters would mean not only less suction, but also the possibility of damage to the filters due to a large pressure differential across them. Frequent cleaning avoids these problems, and also means that the asbestos particles or other solid matter do not stay on the filter or in the system generally for any significant length of time, so that they do not have time to cake together or undergo other undesirable mechanical or chemical changes.

The accumulated solid matter in the discharge tunnel 8 beneath the displacement chamber 2 is ejected at suitable intervals as a cylindrical slug of material about three to four feet long by about one foot in diameter, preferably into automatic bagging apparatus 12, illustrated schematically.

The hydraulic piston 10 has a hardened steel crown (chromed) connected via a connecting rod 13 to the hydraulic piston assembly, and runs in a phosphor bronze liner 11 with scraper rings 15. A proximity switch 17 is used to detect the position of the piston for control purposes. The piston forces a plug of solid matter down the discharge tunnel 8. The discharge tunnel has a reducing collar 19 positioned therein, to provide a short section of reduced diameter. The discharge tunnel then flares from the reduced diameter to a slightly larger overall diameter at the flanged adapter 23, which also changes the cross-section from circular to rectangular. The combined effect of these diameter and shape changes and the reducing collar 19 in particular is to define a throat, the sealing of the discharge area being by virtue of the plug of solid matter jamming rearwardly in the throat. Once the piston retracts, the negative pressure in the displacement chamber cannot draw the plug back in; the plug jams in the throat, thereby choking off that route so that there is no pressure loss. Beyond the throat, in the portion 62 having a rectangular cross-section, the discharge tunnel has a slight outward taper. This slight taper prevents the material in the discharge tunnel from becoming excessively compacted and in fact jammed as it moves towards the automatic bagging apparatus 12. The bagging apparatus, illustrated schematically, automatically bags or preferably double-bags the material. Manual bagging or other means of disposal would be an option, but would not take maximum advantage of the system's capabilities.

This discharge tunnel and seal not only provides an efficient and effective means of getting the asbestos or other material out of the displacement chamber, but also provides a very effective seal during operations in order to maintain the low system operating pressure (high suction), with the above-mentioned advantages.

In some cases, it may be desirable to inject binding agents into the tunnel, depending on the consistency of the asbestos, to ensure proper compaction.

It should be appreciated that any other suitable means of removing the material from the bottom of the displacement chamber in a sealed fashion could be used, the above-described means being merely a preferred means of doing so. For example, other embodiments contemplate the use of a rotary valve (similar in concept to a revolving door).

Figure 2:
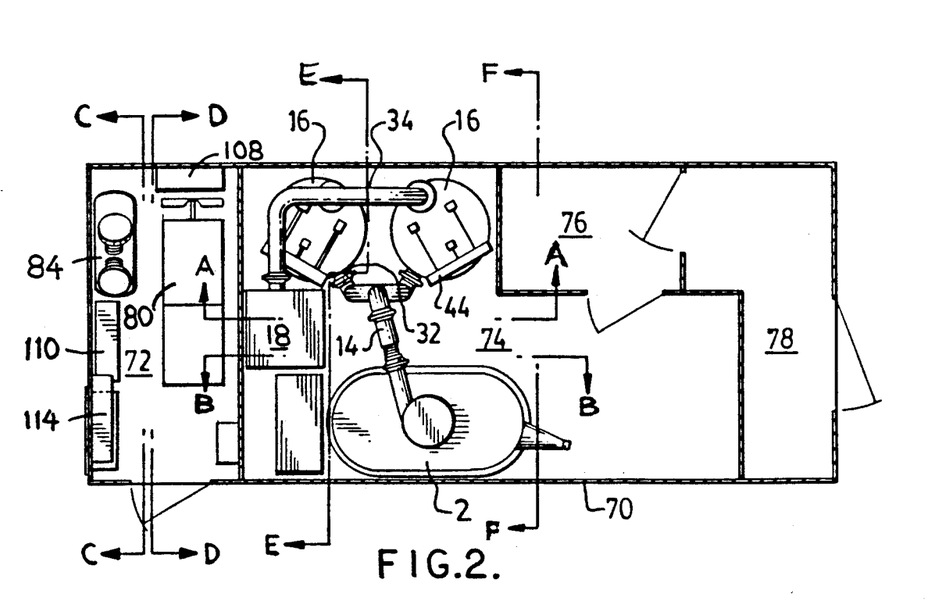
FIG. 2 is a plan view of a trailer containing the apparatus.

Referring now to FIG. 2, all of the apparatus illustrated in FIG. 1 and described above is housed in a trailer 70 which can be brought to the site where the solid matter is to be removed. The trailer is divided into several sections, namely an engine room 72, a process room 74, an airlock/shower/change room 76, and a control booth 78. Workers entering the process room must pass through the airlock/shower/change room via the control booth. The process room 74 is at negative pressure of approximately 0.1 to preferably 0.3 inches of water during operations, by virtue of a negative-pressure fan unit (not shown) protected by pvc filters. Thus any spillage during the bagging operation, for example, still does not result in any release of asbestos fibers to the environment. An internal vacuum cleanup line (not illustrated) is provided, connected to the displacement chamber as the low pressure source, so that the operator can immediately clean up any minor spills within the process room, for example if there is some spillage during replacement of a filter. Since operation of the system can continue during a filter replacement, there is no fear of release of contaminant even then.

The engine room contains a diesel generator 80 to provide power for the system and its controls, the main blower 82 and the air compressor and tank 84. The outlet line from the backup filter 18 passes from the backup filter in the process room, through the wall into the engine room, through the blower, through a silencer 92, out an exhaust 93 via exhaust duct 94. Other components in the engine room include a three-way isolator switch 98, 100 Amp fusible disconnect 100, 110/220 V fuse panel 102, 110/220 V transformer 104, generator electrical panel 106, air outlet 108 with acoustic louvers, diesel fuel tank 110, air inlet 112 with acoustic louvers, and electrical panel 114.

The process room contains the displacement chamber 2 and the filter units 16, as well as a hydraulic pump 88 which drives the piston 10 to compact and expel the plug of solid matter from the bottom of the displacement chamber. The hydraulic pump uses fluid from a hydraulic oil reservoir 116, complete with temperature and level gauges. A hydraulic oil solenoid valve block 118 is mounted on a frame member.

Figure 3:
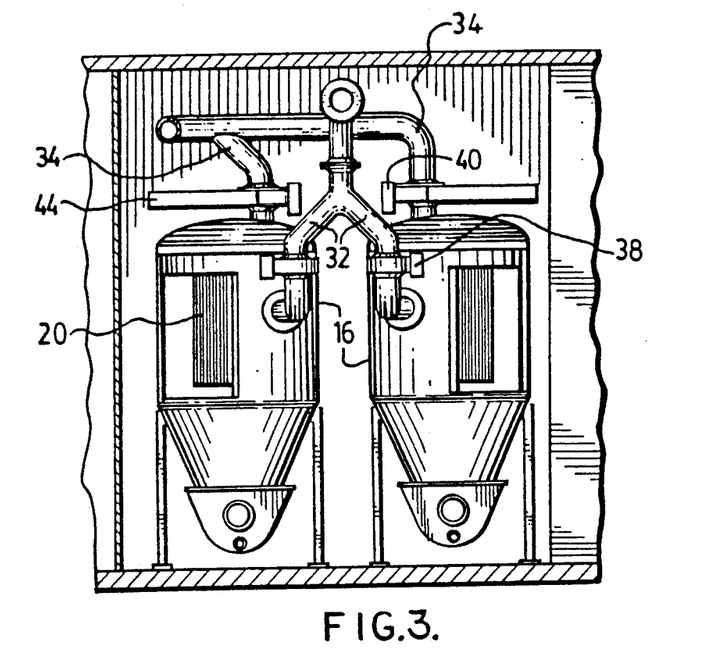
FIG. 3 is an elevation view at A—A in FIG. 2.

FIG. 3 shows the two filter units 16 with their exhausts 34 leading to the backup filter 18, and filter unit inlets 32 connected to the displacement chamber exhaust 14. Pneumatically operated valves 38 and 40 are provided at the inlet and outlet of each filter unit. At the bottom of each filter unit is an agitator unit 50 and dust removal line or return pipe 58.

Figure 4:
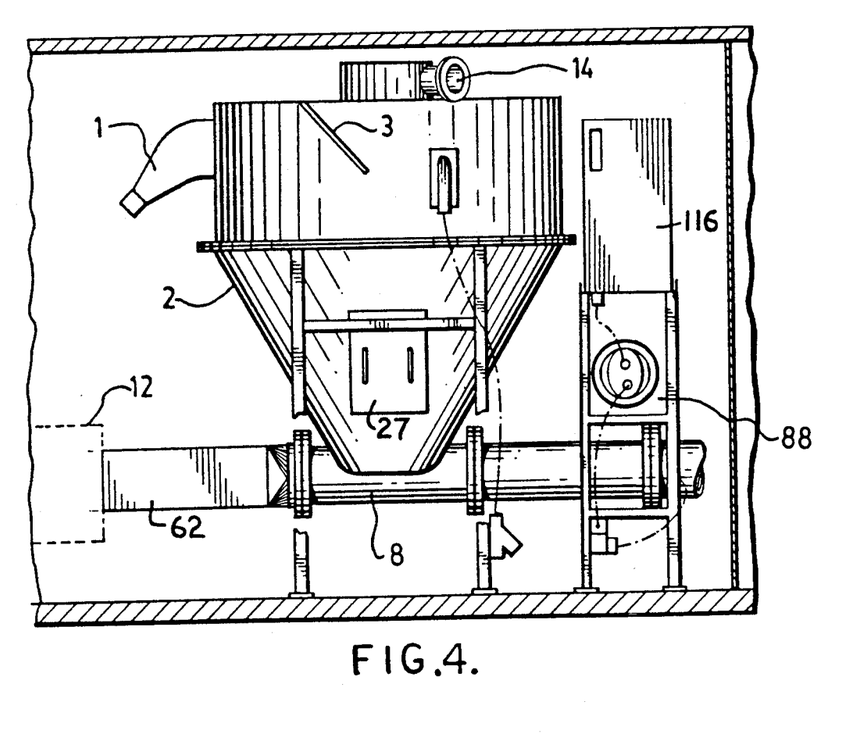
FIG. 4 is an elevation view at B—B in FIG. 2.
Figure 5:
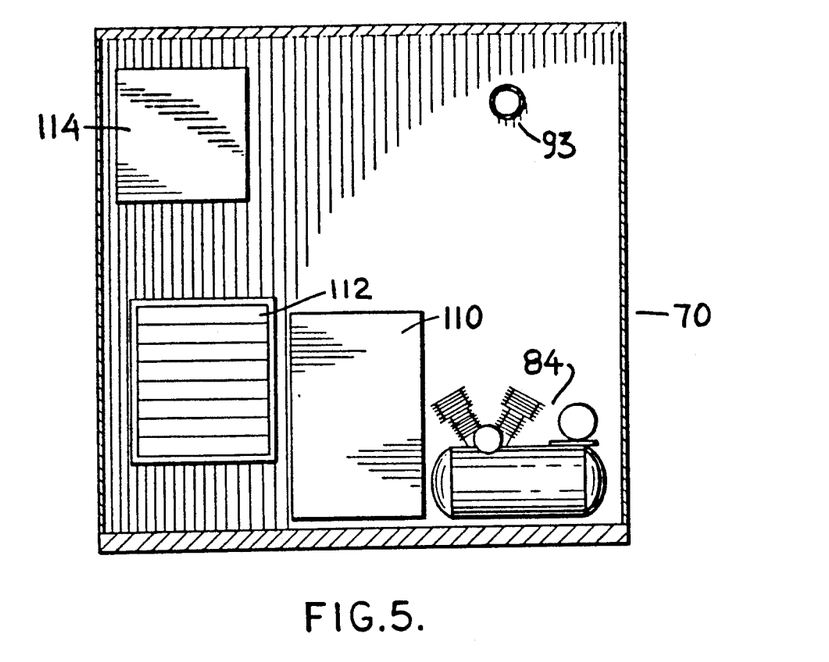
FIG. 5 is an elevation view at C—C in FIG. 2.
Figure 6:
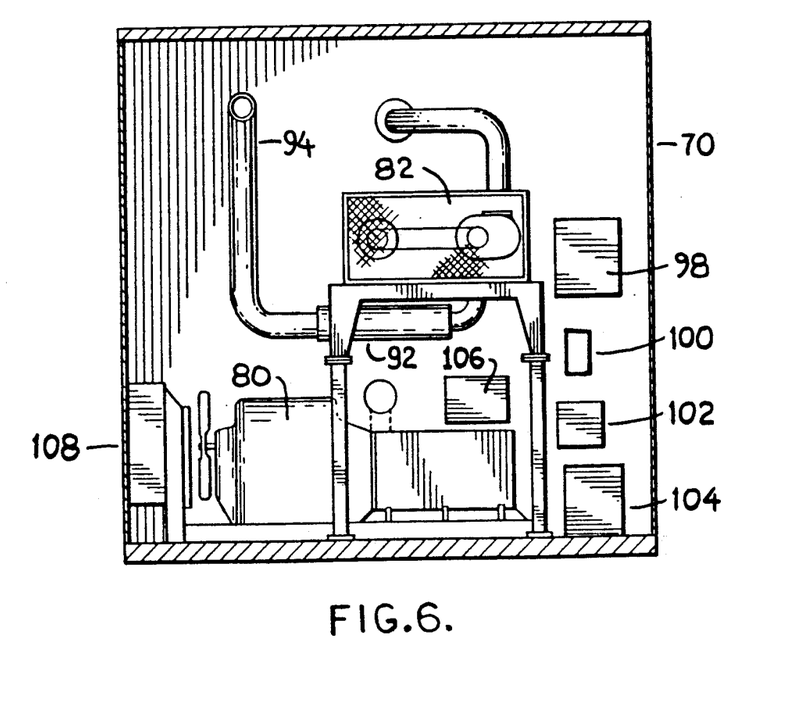
FIG. 6 is an elevation view at D—D in FIG. 2.
Figure 7:
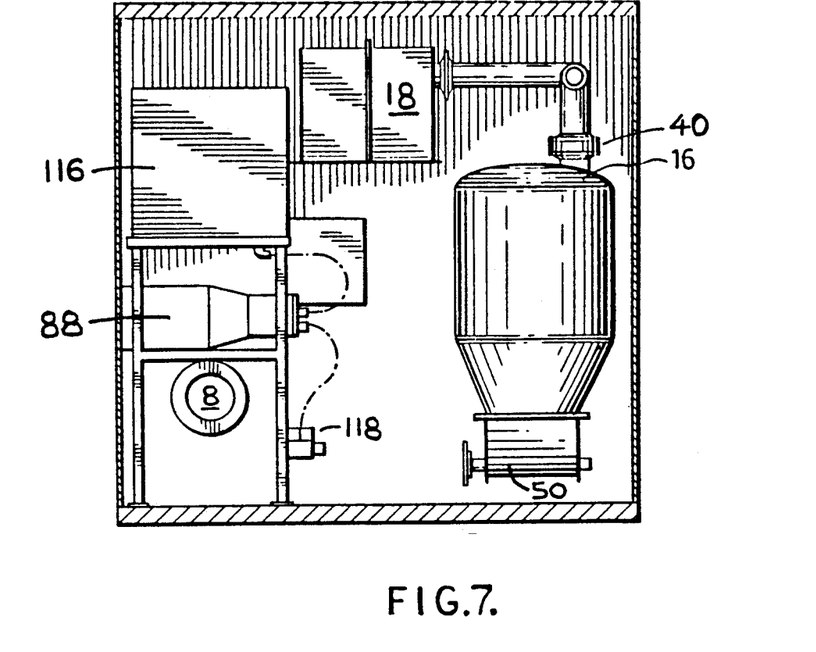
FIG. 7 is an elevation view at E—E in FIG. 2.
Figure 8:
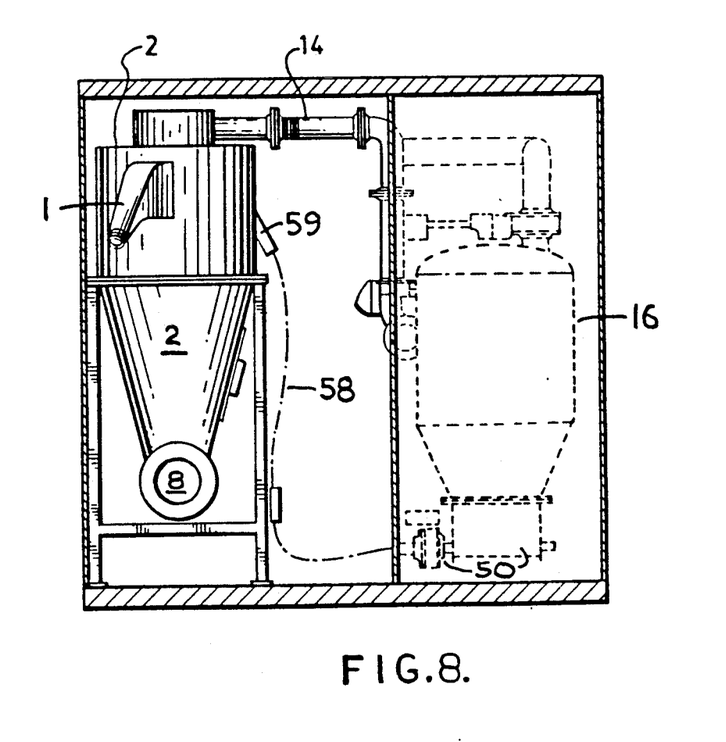
FIG. 8 is an elevation view at F—F in FIG. 2.

FIG. 4 shows the displacement chamber 2 with its inlet 1 to which the inlet hose is connected. The inlet hose is of indeterminate length, with any suitable number of sections coupled together to make up the hose length required to suit the particular job site. The displacement chamber exhaust 14 leads to the filter units 16. An inspection door 27 is provided. The hydraulic pump 88 drives the piston 10 in the discharge tunnel 8, to force a plug of solid matter towards the automatic bagging unit 12, shown schematically.

Various safety features are included. For example, if a filter blows, the absence of a pressure drop across the filter is detected immediately to close off that filter unit for repair.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, the backup filter 18 may not be strictly essential in normal operations, though it is certainly desirable for safety purposes.

In embodiments where it is not essential that the escape of matter to the environment be prevented, the outlet from the filters need not be fed back to the vacuum tank. Instead, the outlet may lead directly to a waste container, conveyor, bagging equipment, or the like.

In the simplest alternative embodiment, the displacement chamber 2 may be dispensed with, in which case the system simply comprises an inlet 1 leading to two filter units 16 installed in parallel, with each filter having an outlet. The outlets may or may not feed back into the same duct. The displacement chamber is generally advantageous where there is a large volume of solid matter in the gas stream, since much of that solid matter may thus be removed upstream of the filters.

What is claimed as the invention is:

1. Apparatus for the removal of matter entrained in a gas stream in a conduit, comprising:
    a displacement chamber having an inlet connected to said conduit to receive said gas stream, a baffle plate disposed therein adjacent said inlet to direct said gas stream somewhat downwardly, a solid matter collecting and discharging area at the bottom thereof for receiving solid matter which falls from said gas stream in said displacement chamber, and a gas stream exit from an upper area thereof;
    at least two filter units, each comprising at least one filter mounted in a housing, said filters defining dirty and clean areas upstream and downstream of said filters respectively, said dirty areas being open to the bottom of said housing such that solid matter may fall therefrom to the bottom of said housing, each said housing being connected in parallel to said gas stream exit of said displacement chamber;
    an outlet at the bottom of each said filter unit housing for removing said solid matter, and an outlet from a clean area of said filter housing thereof for said gas stream;
    for each filter unit, a first valve between it and said displacement chamber gas stream exit for blocking flow through said filter unit when desired for cleaning of said filter unit, a second valve in said filter housing gas stream outlet for actuation in conjunction with said first valve to completely isolate said filter unit from said conduit, a third valve in said solid matter outlet from said filter housing, and a fourth valve connecting the dirty area of said filter housing to a gas source at higher pressure than the pressure in said displacement chamber;
    a duct connected between said solid matter outlet and said displacement chamber via said third valve, whereby said solid matter collected near said solid matter outlet may be routed to said displacement chamber by closing said first and second valves to isolate said filter unit and then opening said third and fourth valves; and
    pressure-sealed conveying means connected to said solid matter collecting said discharge area in said displacement chamber for removing solid matter from said displacement chamber.

2. Apparatus as recited in claim 1, further comprising air jets within each filter unit positioned in said clean areas to direct air through said filters towards said dirty areas, said air jets being connected to a pressurized air source, whereby solid matter clinging to said filters may be removed from them when flow through said filter unit is blocked by at least said first valve, said solid matter then being free to fall to the bottom of said filter housing.

3. Apparatus as recited in claim 1, in which the pressure in said displacement chamber is below ambient pressure external to the apparatus, and in which said gas source to which said fourth valves connect is the ambient air external to the apparatus.

4. Apparatus as recited in claim 1, housed in a sealed trailer, said trailer having a blower drawing air therefrom through a fine filter, whereby the interior of said trailer is maintained at a slight negative pressure at all times, so that any escape of matter from said apparatus remains contained within said trailer or is trapped by said fine filter.

5. Apparatus as recited in claim 1, in which said pressure-sealed conveying means connected to said solid matter collecting and discharge area in said displacement chamber comprises a discharge tunnel for receiving said solid matter through an opening at the bottom of the displacement chamber, and a piston reciprocating in said discharge tunnel to force a plug of solid matter along said discharge tunnel from the area of said opening, the sealing of said discharge area being by virtue of the plug of solid matter in said discharge tunnel, the pressure in said displacement chamber being less than ambient pressure around the apparatus.

6. Apparatus as recited in claim 5, in which the area of said discharge tunnel is reduced down-tunnel from the area of said piston, said reduced area portion defining a throat, the sealing of said discharge area being by virtue of the plug of solid matter jamming rearwardly in said throat by virtue of the ambient pressure being greater than the pressure in the displacement chamber.

7. Apparatus for removal of particulate and/or fibrous solid matter, comprising:
    a blower for creating suction;
    a suction hose for collecting the solid matter, connected to said blower via a displacement chamber and at least two filter units installed in parallel, said displacement chamber being connected to receive near the upper end thereof solid matter entrained in the gas stream from said suction hose and having a baffle plate disposed therein adjacent said inlet to direct said gas stream somewhat downwardly, and further having an upper exhaust leading to said filter units and a pressure-sealed bottom exit for solid matter falling from said gas stream; said at least two filter units being installed in parallel between said displacement chamber and said blower, each filter unit including at least one filter mounted in a housing, said filter defining dirty and clean areas in said filter housing upstream and downstream of said filters respectively, said dirty areas connected to receive said gas stream from said upper exhaust from said displacement chamber and being open to the bottom of said housing such that solid matter may fall therefrom to the bottom of said housing, said clean areas being connected to lead towards said blower; said apparatus further comprising:

isolation valves upstream and downstream of each filter unit for closing off each said filter unit for cleaning when desired;

a return conduit from each said filter unit connecting the dirty side of each said filter with said displacement chamber, a return valve in said conduit for opening and closing said return conduit, an opening from said dirty side to ambient air, and an ambient air valve to open and close said ambient air opening to supply or deny ambient air to each filter housing; whereby each filter unit may be cleaned in turn by closing its isolation valves and opening its ambient air and return valves.

8. Apparatus as recited in claim 7, further comprising air jets within each filter unit positioned in said clean areas to direct air through said filters towards said dirty areas, said air jets being connected to a pressurized air source, for thereby cleaning the filters to remove solid matter therefrom when flow therethrough is blocked by at least said first valve, such that solid matter clinging to said filters falls to the bottom of said filter housing.

9. Apparatus as recited in claim 7, in which said bottom exit for said solid matter is in the form of an opening into a discharge assembly, said discharge assembly comprising a tunnel and a piston reciprocating in said tunnel to force a plug of solid matter along said tunnel from the area of said opening, the sealing of said bottom exit being by virtue of the solid matter plug in said tunnel.

10. Apparatus as recited in claim 9, in which said tunnel has a reduced area portion down-tunnel from said piston, said reduced area portion defining a throat, the sealing of said bottom exit being by virtue of said plug of solid matter jamming rearwardly in said throat.

* * * * *